(12) United States Patent
Baba

(10) Patent No.: US 7,466,334 B1
(45) Date of Patent: Dec. 16, 2008

(54) METHOD AND SYSTEM FOR RECORDING AND INDEXING AUDIO AND VIDEO CONFERENCE CALLS ALLOWING TOPIC-BASED NOTIFICATION AND NAVIGATION OF RECORDINGS

(75) Inventor: Michael Baba, Silver Spring, MD (US)

(73) Assignee: CommFore Corporation, Silver Spring, MD (US)

( * ) Notice: Subject to any disclaimer, the term of this patent is extended or adjusted under 35 U.S.C. 154(b) by 1415 days.

(21) Appl. No.: 10/244,684

(22) Filed: Sep. 17, 2002

(51) Int. Cl.
H04N 7/15 (2006.01)

(52) U.S. Cl. .................. 348/14.06; 348/14.08

(58) Field of Classification Search ........... 348/14.06, 348/14.08, 14.09
See application file for complete search history.

(56) References Cited

U.S. PATENT DOCUMENTS

| | | | |
|---|---|---|---|
| 5,668,863 A | 9/1997 | Bieselin et al. | |
| 5,710,591 A | 1/1998 | Bruno et al. | |
| 5,794,178 A | 8/1998 | Caid et al. | |
| 5,918,236 A | 6/1999 | Wical | |
| 6,185,527 B1 | 2/2001 | Petkovic et al. | |
| 6,185,531 B1 | 2/2001 | Schwartz et al. | |
| 6,239,801 B1 | 5/2001 | Chiu et al. | |
| 6,298,129 B1 | 10/2001 | Culver et al. | |
| 6,308,187 B1 | 10/2001 | DeStefano | |
| 6,334,022 B1 | 12/2001 | Ohba et al. | |
| 6,349,303 B1 | 2/2002 | Saito | |
| 6,377,995 B2* | 4/2002 | Agraharam et al. | 709/231 |
| 7,039,585 B2* | 5/2006 | Wilmot et al. | 704/235 |
| 2003/0174830 A1* | 9/2003 | Boyer et al. | 379/265.02 |
| 2003/0187632 A1* | 10/2003 | Menich | 704/1 |

* cited by examiner

Primary Examiner—Stella L Woo
(74) Attorney, Agent, or Firm—James Creighton Wray; Clifford D. Hyra

(57) ABSTRACT

Recording and indexing audio and video conference calls allows topic-based notification, navigation and playback of one or many recordings. An external conferencing system with five internal modules, recording, indexing, management, notification, and playback allows a plurality of meeting participants to record a conference call, and a plurality of subscribers to access, search, and be notified of the occurrence of an event of interest. The system automatically creates contextual or topic based time intervals which are used to immediately notify a subscriber of an event occurrence. The subscriber can use the time stamps of the topic intervals to navigate and playback the recording. The system also indexes project management files and correlates recording intervals to project tasks, and subsequently correlates multiple recording intervals.

49 Claims, 10 Drawing Sheets

System Overview

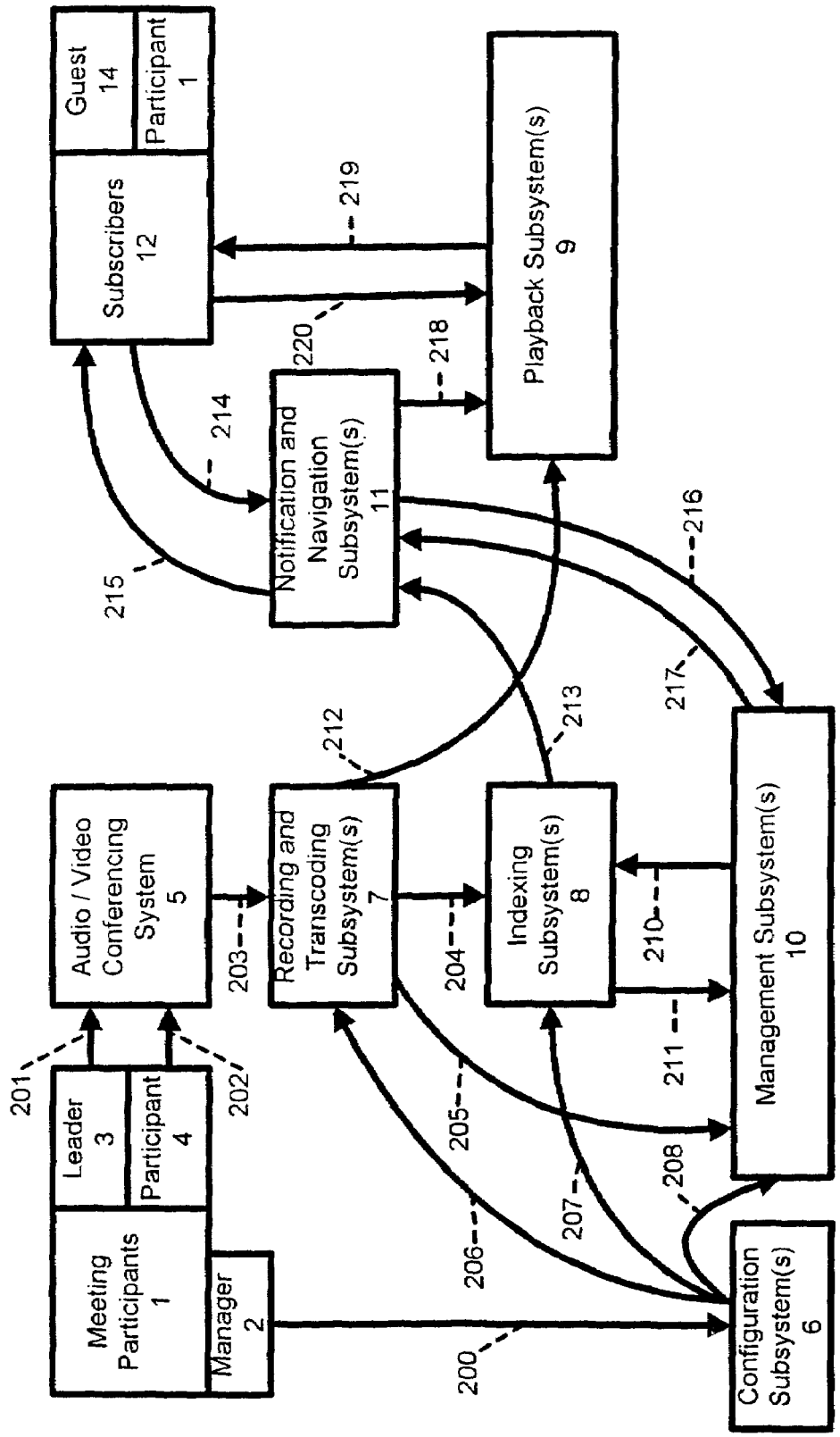
Figure 1 - System Overview

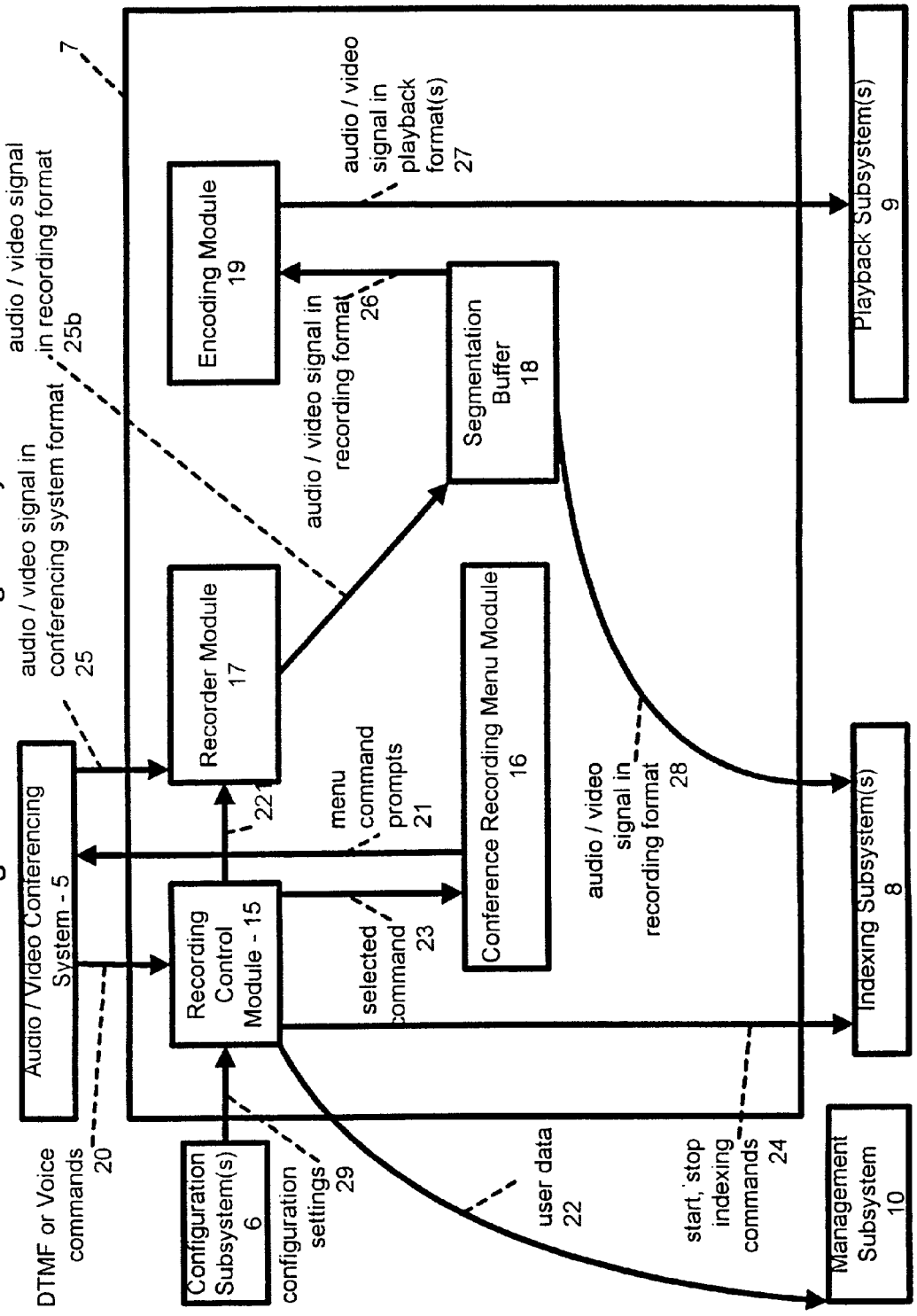

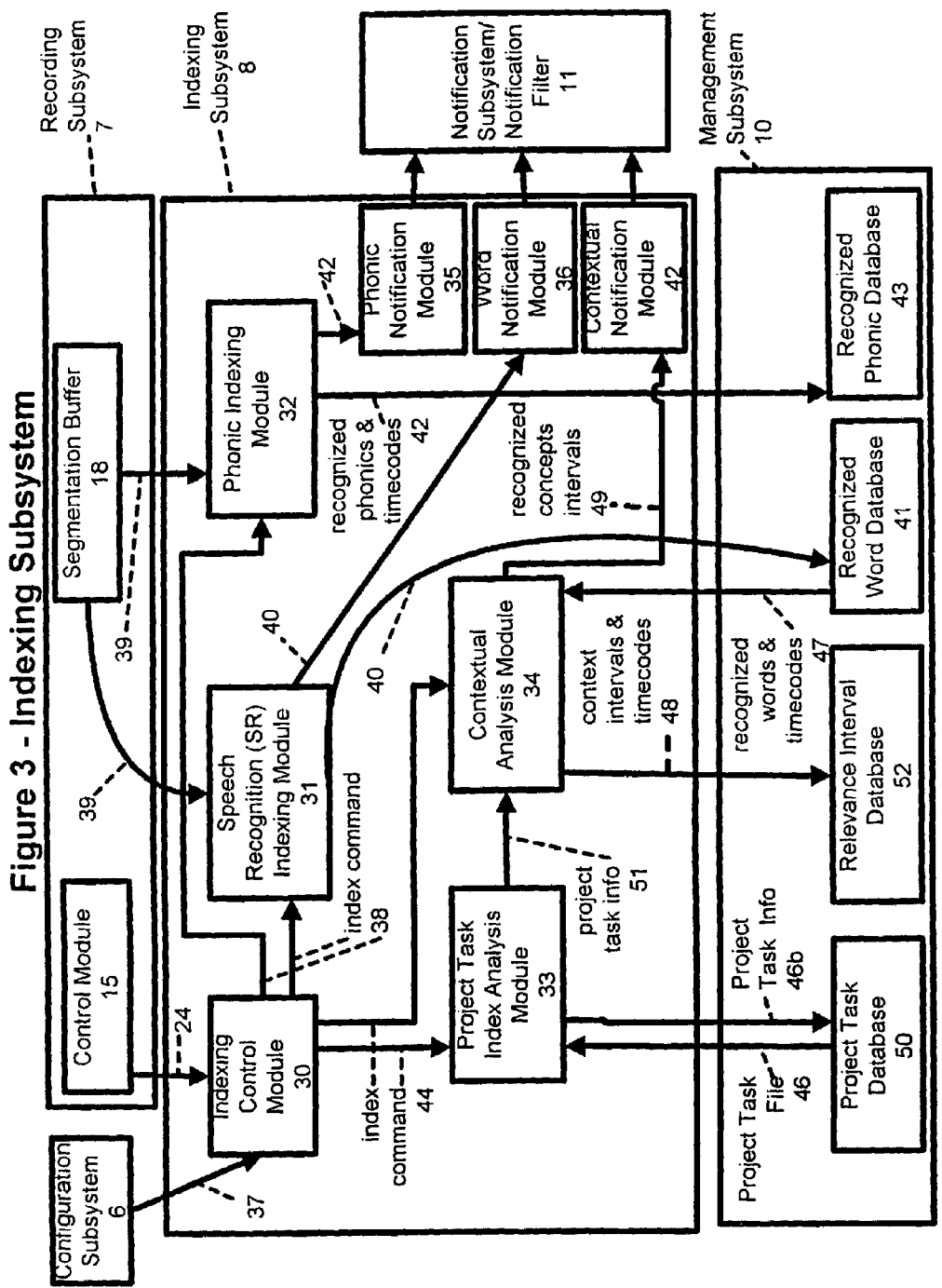
Figure 3 - Indexing Subsystem

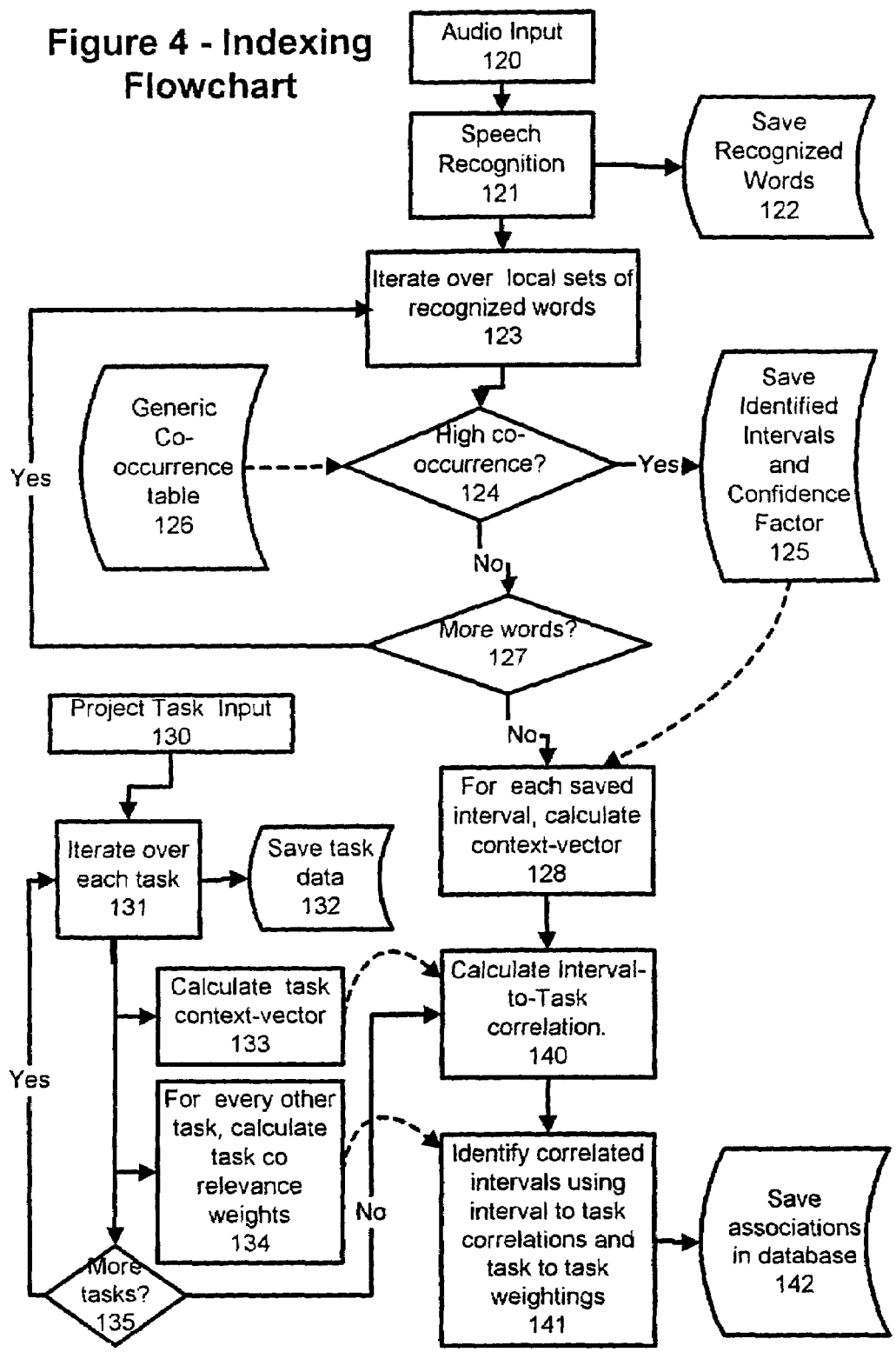

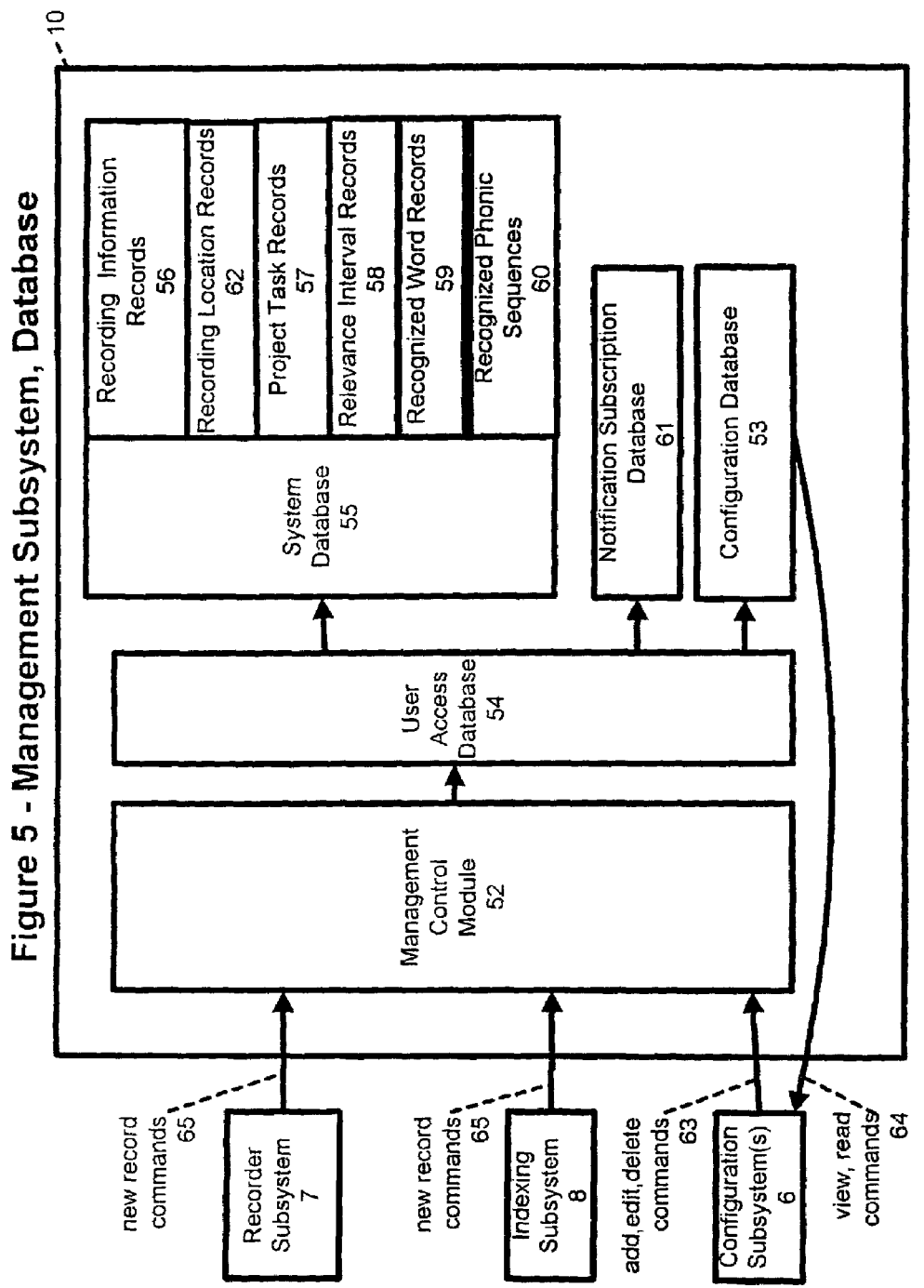
Figure 5 - Management Subsystem, Database

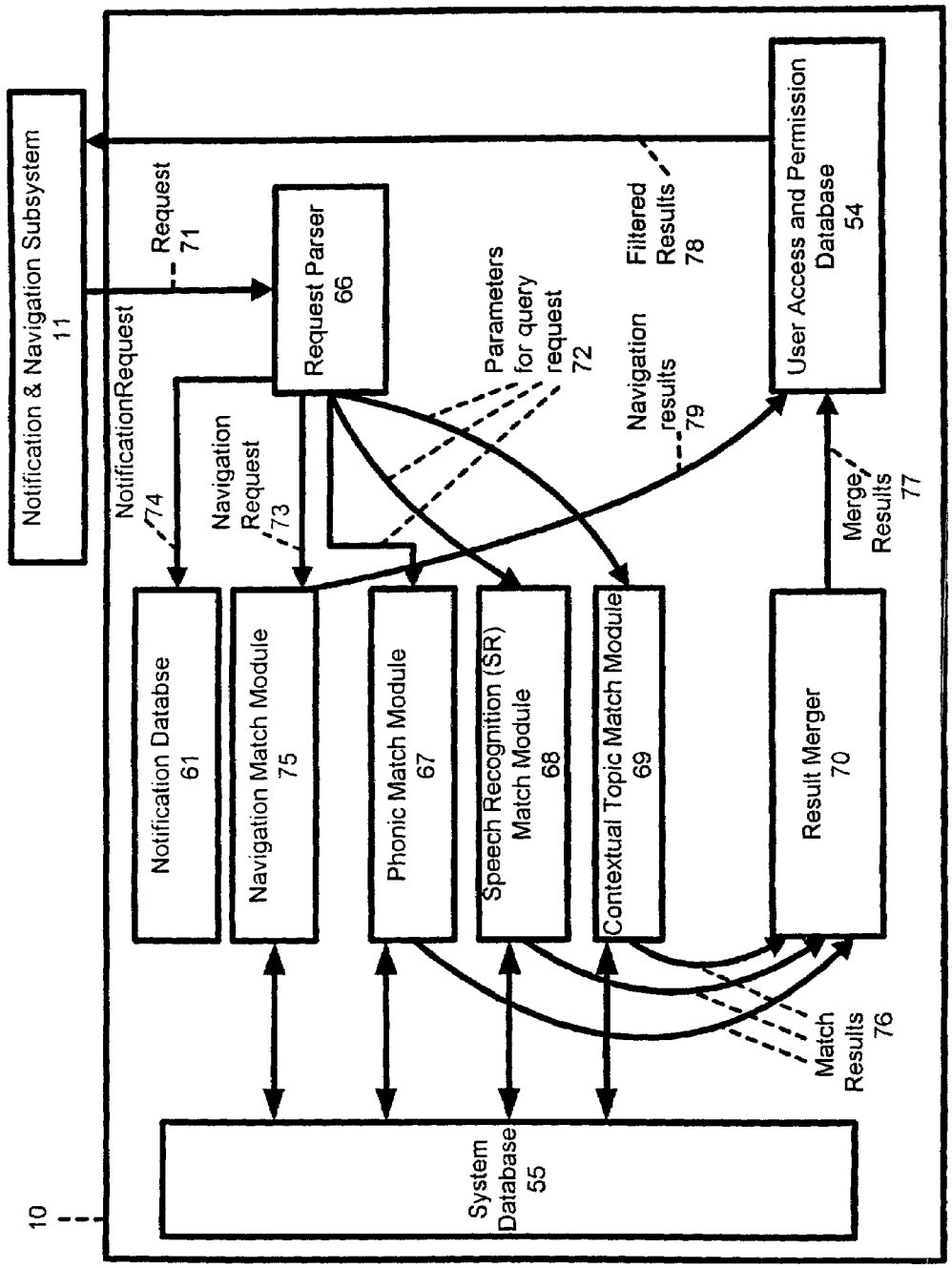

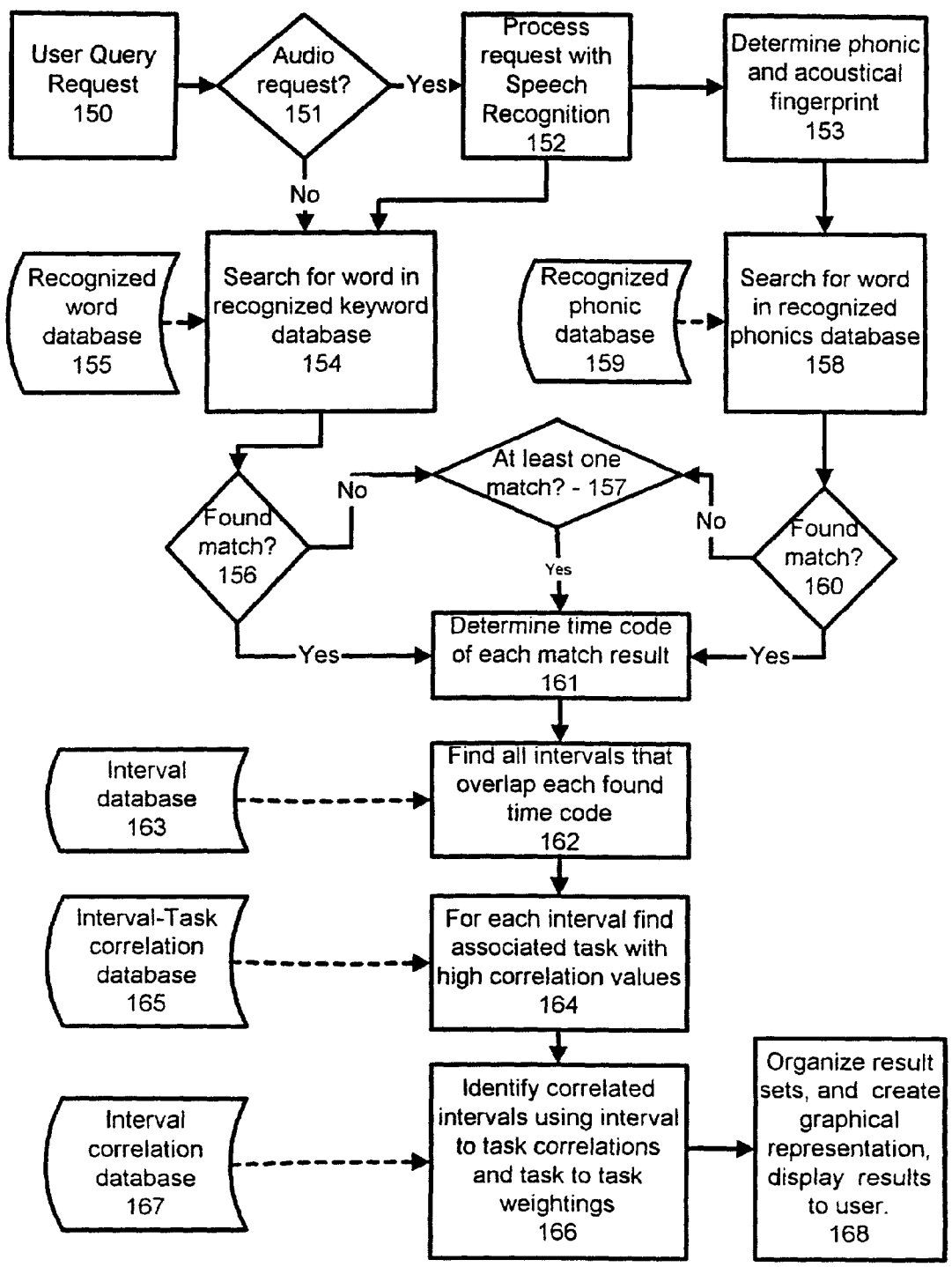

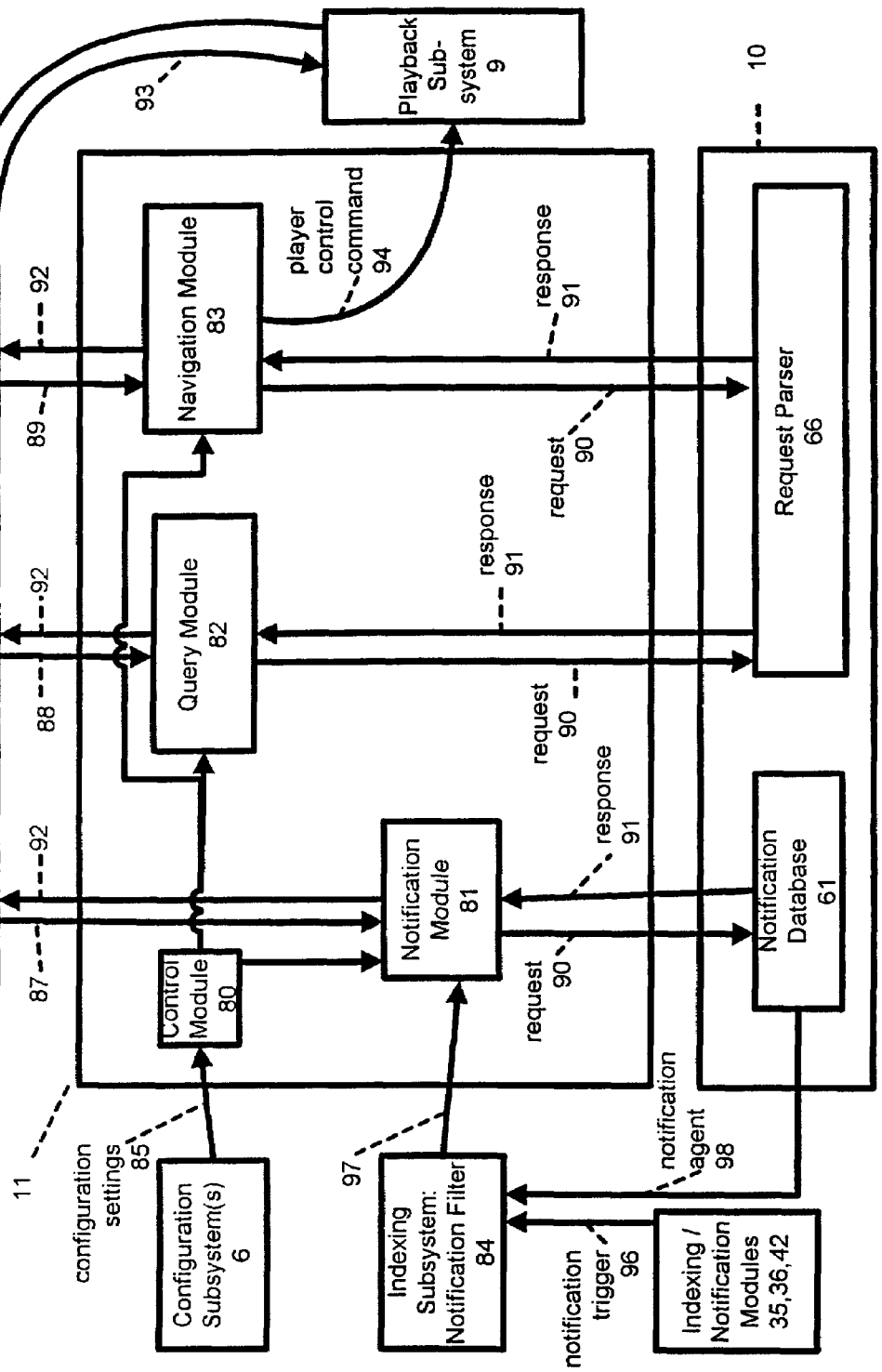
Figure 8 - Notification and Navigation Subsystem

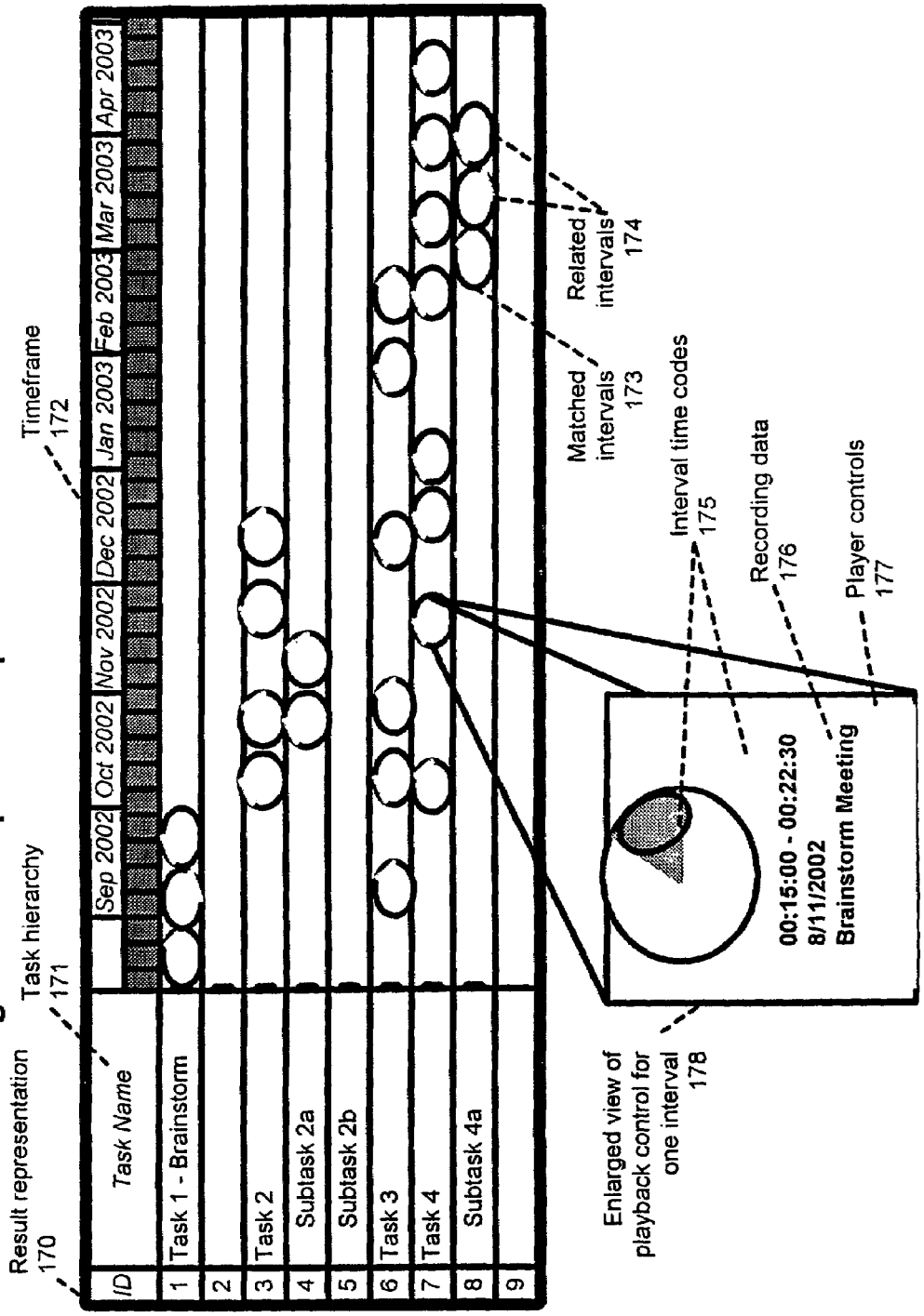

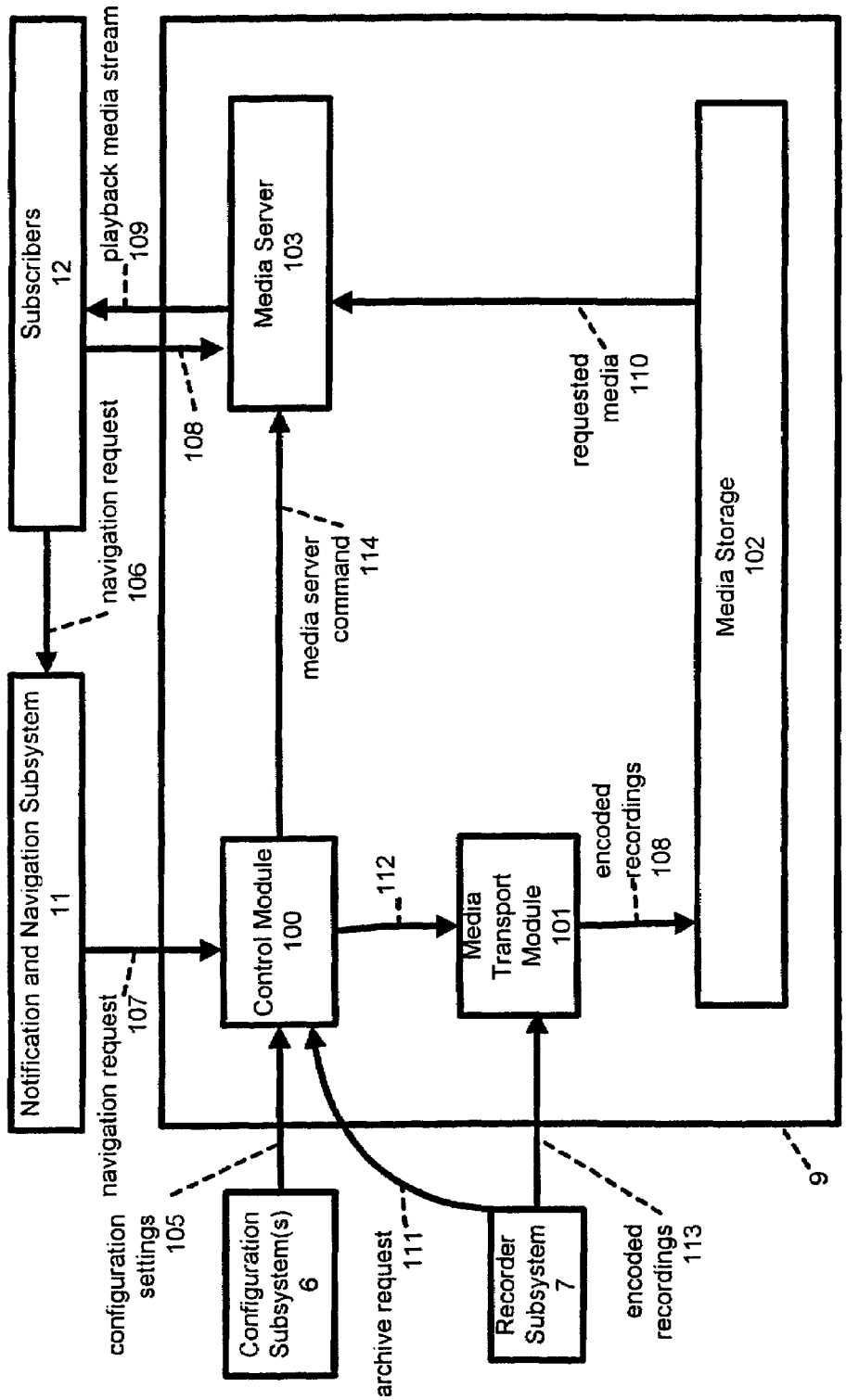
Figure 10 - Playback Subsystem

METHOD AND SYSTEM FOR RECORDING AND INDEXING AUDIO AND VIDEO CONFERENCE CALLS ALLOWING TOPIC-BASED NOTIFICATION AND NAVIGATION OF RECORDINGS

BACKGROUND OF THE INVENTION

Organizations that have technical engineering personnel including: computer programmers, natural science engineers, project managers and information technology (IT) support staff typically conduct regular status or review meetings throughout the lifespan of a engineering or software development project. Professional service consulting firms having personnel in similar roles, typically conduct project design and review meetings with customers who have engaged their services. For some project members, attending in-person may require traveling a large distance at a significant cost. Audio or video teleconferencing systems are well known to anyone schooled in the art, and are often used to conduct project meetings, reducing the need for travel and hopefully fostering greater communication frequency and reporting among team members. Furthermore, project management software is often utilized to plan project tasks and schedules, assign resources to a task, monitor development progress, and determine prerequisite tasks and other constraints to the timely completion of a project. During a project status call, the project plan often drives the meeting agenda, discussion topics, and action items.

Since conferencing calls are often used as an alternative to in-person meetings, and because conferencing calls rarely achieve the same level of information interchange among all participants, it is desirable to be able to record a conference call for later use or review. The benefits of recording a conference call include the ability to review what a stated about a specific topic. Recording allows participants to fully concentrate on the current discussion rather than being sidetracked by extensive note taking. Recording establishes a full and complete record of the call rather than a summary or subjective dictation, and it allows anyone who has missed the meeting to replay a complete and unfiltered recording of the meeting.

Many U.S. patents address teleconferencing systems and several specifically address the area of recording audio or video conference calls as discussed above. U.S. Pat. No. 5,668,863 describes a method and apparatus for recording audio conference calls in which each participant is independently recorded. These recordings are then combined in a linear fashion, and each block is associated with the participant's voice name tag.

U.S. Pat. No. 5,710,591 describes an audio and video recording apparatus which makes use of a Multipoint Control Unit (MCU) that is capable of determining which one of the participants should be recorded (usually the loudest) at any given time. By switching between the loudest speaker, the recording device creates a single recording which tracts a single speaker at a time. This single recording can then be processed by a transcription application. The time at which a new speaker is recorded can be saved and later used to navigate (i.e. fast-forward to a specific speaker) within the recording.

U.S. Pat. No. 6,239,801 describes a method and system for using symbolic icons (an analog clock face is illustrated) that designate the start time, stop time, and progress of an interval or portion of an multimedia recording. These icons are manually designated by the presenter during the recording, created at designated intervals, or designated at pre-defined events such as when a new slide is presented. These icons can be used to control the playback of a recorded multimedia session.

U.S. Pat. No. 6,100,882 describes a method of creating a textual representation of an audio conference call by individually recording each participant using separate recording device that is located on the participant's terminal. Each participant's recording is processed by a speech-to-text application to create a textual representation. The text is propagated to each other participant on the call and is joined to create a single linear transcription of the meeting.

U.S. Pat. No. 6,298,129 describes an audio teleconferencing system allowing the meeting leader to time stamp or bookmark the call as it is in progress and being recorded. The system includes a computer server with a web-based interface allowing participants to playback portions of the recording from one bookmark to another over the computer system.

U.S. Pat. No. 6,334,022 describes a video recording device that allows simultaneous recording and playback of video recordings, allowing viewers to time-shift their viewing of video recordings. The system has embodiments that include automatic video indexing based on scene detection image detection, or at preset time intervals. A filtering module is described to allow only the recording of video programs based on channel programming information.

U.S. Pat. No. 6,349,303 describes an audio video information processing apparatus that uses a speaker segmentation method and speech-to-text recognition software to create a linear meeting summary document. The documents can embed a still picture taken from a video camera next to the text representation for each block or time interval.

U.S. 2002/0002584 describes an information sharing system that includes a messaging communication module between two or more terminals. The system allows a non-participant to view a conference recording as a spectator. Participants can manually tag relevant time intervals within the recording. Multiple recordings can be searched based on these manually entered comments.

Problems that limit the usefulness of the above conference recording and indexing systems have been identified. One class of systems and methods known in the prior art, requires manual tagging or indexing. For example, the meeting leader has to manually mark or designate the start and stop times and provide commentary for each interval of interest. Another class of prior art automates the interval time marking by detecting physical events, such as the change in a speaker. The problem in that approach is that the detected events have no notion of conceptual knowledge. For example, when a manager and subordinate are discussing a topic, intervals are created for each change of speaker, but no interval is created covering the entire topic being discussed. A third class of prior art utilizes speech recognition software to automate the time stamping of any words that are recognized during the conferencing call. That approach suffers from the inherent ineffectiveness of the speech recognition software (estimated between 70-90% word accuracy rates) and only results in indexing of words. There is no notion of conceptual knowledge.

Context-based analysis of text documents, or text derived from speech recognition of audio, is an analysis method to identify and represent the sections of one document, or a collection of documents, that have similar traits. These traits can be assigned to a topic or can be associated to a classification hierarchy, or can be used to identify new documents having similar traits. Several U.S. Pat. Nos. 5,918,223 6,185, 527 and 6,186,531 address context analysis or topic analysis for audio information. Additionally, other patents address the abstraction or gisting of documents and the subsequent visual presentation of abstract data.

U.S. Pat. No. 5,918,223 uses segmentation and acoustical feature (loudness, bass, pitch, etc.) analysis to create sound fingerprints of many very-short intervals in an audio file. The fingerprints provide an index that can be used to search by example in a management system to find similar sounds. This work operates only on the audio sound and does not try to recognize words spoken.

U.S. Pat. No. 6,185,527 uses segmentation and acoustical analysis to identify the type of audio (music, speech, speech on music, silence) prior to passing the speech segments to a speech recognition analysis module for automatic indexing. Points of emphasis, or concluding remarks based on acoustical analysis and frequency are noted. Furthermore, a navigation method can skip over certain types of audio, for example, multiple 30-second intervals of speech or music representing commercials.

U.S. Pat. No. 6,185,531 covers topic based indexing using context-vectors to automate classification of a text document, or text derived from speech recognition of audio. This approach requires training sets to create topic models, and then classifying a new document to the topic it most closely matches.

U.S. Pat. No. 5,794,178 covers a visualization technique by which the context-vectors of sampled data are displayed with multiple attributes. Documents that are similar in topic are graphically displayed in neighboring regions of a computer display. Furthermore a navigation technique including zooming, rotating the point of view and selectively choosing the abstraction level are noted.

U.S. Pat. No. 5918-236 illustrates the automatic creation of multiple gists or abstracts for a simple document using thematic profiling. A document browsing system is shown, allowing different users with different topic interests to view the same collection of documents, where only the gist of interest to the user are displayed.

U.S. Pat. No. 6,308,187 covers a method of displaying a chronologically arranged collection of documents allowing a user to visualize relationships between different documents or information elements within a document.

Needs exist for better recording and indexing systems for video conferencing.

SUMMARY OF THE INVENTION

The present invention relates to audio and video conferencing recording systems and particularly pertains to a system and method of recording, indexing and storing conference calls that allows for immediate notification, navigation and playback of one or many recordings. The system of the present invention combines the use of an audio or video teleconferencing system with a recording device, an automated topic indexing device, a management module, a storage device, a notification and navigation module, and a playback device. The method of the current invention allows the notification and navigation of the recordings by automating the indexing process to create context or topic based intervals. The system also indexes project management files and can correlate recording intervals to project tasks, and subsequently correlate multiple recording intervals.

To address the identified shortfalls of the prior art, the current invention creates and combines in a new and non-obvious manner five subsystems covering the recording, indexing, storage, notification and playback of audio and video conference calls. The objectives of the invention not addressed in prior art include:

Creating a method for automatic and intelligent segmentation of audio recording, allowing a plurality of independent analysis modules to work on discrete segments in a distributed non-linear fashion.

Automating without the use of training, the indexing of an audio track of a teleconferencing call, resulting in topic-based intervals which can be used in a management system to search and navigate a collection of recordings.

Automating the association of topic intervals with a project plan including task hierarchies, task dependences, resource assignments and temporal constraints.

Given one topic intervals, automating the identification of related topic intervals through the use of weighting topic association calculated above.

Improving search results by combining non-trained acoustical or phonic matching with the topic-based index intervals to yield greater search recall without negatively impacting topic precision.

In addition to searching, allowing users to subscribe to a topic of interest, and to be immediately notified through a variety of devices of the occurrence of a topic event.

Creating an intuitive graphical representation of search results and notifications that allow a user to iterate through or filter a result set, to navigate within one or more chronologically arranged recordings, and to visualize a hierarchy of task and topic intervals.

The present invention implements a new architecture and method for recording and indexing audio and video conference calls. The system of the current invention combines the use of an external audio/video conferencing system with five internal modules (recording, indexing, management, notification, and playback) allowing a plurality of meeting participants to record a conference call, and a plurality of subscribers to access, query and/or be notified of the occurrence of an invent of interest. The system of the new invention substantially departs from the prior art by automatically creating contextual or topic based time intervals which are used to immediately notify a subscriber of an event occurrence. The subscriber can use the time stamps of the topic intervals to navigate and playback the recording.

The system includes the capability to time-shift the playback of a recording, allowing for instance the ability to pause, rewind, or fast-forward a conference call that is in progress and is simultaneously being recorded.

When a conference call is in progress, and the meeting leader desires to record the call, a separate channel (in silent mode) from the recording module is bridged into the conferencing system. The recording module segments the incoming audio/video stream based on a configurable time interval, resulting in many smaller recordings chunks. Each recording segment is then processed independently by the encoding, indexing and notification modules. When all segments have been processed, they are concatenated back together for management and access control.

A conference call is recorded, and the audio track of the call is automatically indexed, using a combination of phonic and speech recognition analysis software. The audio indexing results are combined with contextual information abstracted from project management files that have been associated with or used during the conferencing call. This automated indexing results in a hierarchy of overlapping time intervals, each interval pertaining to a relevant topic, which may be associated with a specific project task item.

Subscribers or spectators can search the management system to identify recordings of interest and play back the entire conference recording or only the portions of interest to a subscriber. Subscribers can access the system using conventional desktop computers, portable digital assistants (PDAs), data-enabled digital mobile phones or traditional phone systems. Subscribers can also submit notification requests, after which the occurrence of a recognized word, phonic sequence or topic event will generate a message to the subscriber.

These and further and other objects and features of the invention are apparent in the disclosure, which includes the above and ongoing written specification, with the claims and the drawings.

BRIEF DESCRIPTION OF THE DRAWINGS

FIG. 1 is a system overview and is a schematic representation of the system of the present invention.
FIG. 2 shows the recording and transcoding subsystem.
FIG. 3 shows the indexing subsystem.
FIG. 4 is an indexing method flowchart.
FIG. 5 shows the management subsystem and database.
FIG. 6 shows the management subsystem and query resolver.
FIG. 7 is a query request and result merge flowchart.
FIG. 8 shows the notification and navigation subsystem.
FIG. 9 is a graphical representation of result set.
FIG. 10 shows the playback subsystem.

DETAILED DESCRIPTION OF THE PREFERRED EMBODIMENTS

FIG. 1 is a system overview and is a schematic representation of the system of the present invention with a plurality of project participants 1 interacting with an external conferencing system 5. Project participants consist of a project manager 2, a meeting leader 3 and a plurality of meeting participants 4. The project manager 2 is responsible for setting initialization parameters 200 stored in the configuration system 6 that govern the recording, indexing, and management of any future recordings for that project. Each conference call to be recorded and processed has a designated meeting leader 3 who is responsible for initiating 201 the conference recording and entering the appropriate identification 203 information when requested by the recording subsystem 7.

The recording subsystem 7 receives the audio/video stream 203 from the external conferencing system 5 in the format and protocol of the conferencing system. To the conferencing system the recording subsystem appears to be just another participant on the conference call. An audio conferencing system can connect to the recording module by dialing a telephone number of the recording subsystem gateway. A video conferencing system can connect to the recording subsystem by dialing the appropriate ISDN or network based address of the recording module or gateway as required. Alternatively the recording subsystem can be configured to initiate the call to the external conferencing system.

The recording subsystem 7 obtains project configuration settings 206 from the configuration subsystem 6 as entered by the project manager 2. Configuration settings relevant for the recording subsystem include project identification and recording authorization, time-based segmentation parameters, encoding formats and parameters, and workflow parameters, identifying which indexing subsystem 8, playback subsystems 9 and management subsystem 10 are to be used for the current call recording.

In addition to recording the inbound conference call, the recording subsystem 7 also performs encoding of the input stream to produce an output audio/video stream 212 suitable for playback via the playback subsystem 9. The identification, format, and location of the playback stream 205 is stored in the management subsystem 10, and only the stream itself is stored in the playback subsystem.

After each recorded segment is encoded, the segment 204 is processed by the indexing subsystem 8. The indexing subsystem contains multiple audio indexing modules, and in one embodiment contains a Speech Recognition (SR) index module, a Phonic index module and a Project Task index module. The outputs 211 of the indexing modules include recognized works and phonics and their corresponding timecodes. These recognized words are fed back 210 into a Contextual Analysis module and are combined with the project task information to produce time intervals having a corresponding project task identification. All of the recognized words, phonics, intervals and project tasks are stored in the management subsystem 10.

The indexing subsystem 7 is also responsible for triggering notification events 213 that are sent to the notification subsystem 11. Events of interest that can trigger notification messages include recognized keywords and phonics, contextual events and project task events. In one embodiment every event causes a message to be triggered. In another embodiment, a filtering mechanism is applied within the indexing subsystem to screen-out events to which no one has subscribed.

The management subsystem 10 contains a database of recognized words and phonics from the indexing subsystem 8, the project task information entered or uploaded by the project manager 2 via the configuration subsystem 6, the notification subscription information from the notification subsystem 11, and recording location information sent from the recording subsystem 7 for identifying the location of the playback media in the playback system 9.

Additionally, the management subsystem contains an access control list maintained by the project manager through the configuration subsystem 6. The access control list filters or limits the results of a query request submitted by a subscriber 12 via the notification and navigation system 11.

A subscriber 12 may be one of the meeting participants 1, or any other guest 14 who is granted access to the system by the project manager. A subscriber interacts 214 with the system via the navigation and notification system 11 to submit queries, subscribe to events, and navigate through one or more recordings. When a subscriber submits a query request, the request is sent to the notification and navigation system 11. The notification system forwards 216 the query to the management subsystem 10 to return a set of results 217 for which the subscriber is allowed access 215. The result set contains the timing and location information for all events that match the query request. If a subscriber desires, he forwards the result set 220 to the playback server, and the recorded conference segments at the appropriate time intervals are played 219.

Also, a subscriber 12 can submit a notification request to the notification subsystem 11, requesting to be notified whenever an event of interest to the subscriber occurs. All notification subscriptions are stored in the management subsystem 10 database and are forwarded to the indexing subsystems 8. When an indexing subsystem detects an event of interest 213, it triggers a notification message, which is sent via the notification system to the subscriber. The notification message 215 contains the timing and playback location information for the triggering event. If a subscriber desires, he forwards the message to the playback server, and the recorded conference segment at the appropriate time intervals is played.

Using the results of either a query request or notification event, a subscriber may navigate through the current recording, iterate through the results set of multiple recordings, or submit a navigation request or query refinement using the current results as an argument. Navigation requests are submitted to the notification and navigation subsystem 11 and are processed in the same manner as query requests.

FIG. 2 is a schematic representation of the recording subsystem. The recording subsystem 7 accepts an input stream 25 from the external audio/video conferencing system 5 and records the input stream by segmenting at designated time intervals obtained from the configuration subsystem 6. The recording subsystem performs encoding of the input stream to produce an output audio/video stream 27 suitable for playback via the playback subsystem 9 and informs the management subsystem 10 of the location of the recording. After each recorded segment is encoded, the segment is processed by the indexing subsystem 8.

The recording subsystem contains a recording control module 15, a conference recording menu module 16, a recorder module 17 a segmentation buffer 18, and an encoder 19.

The recording control module 15 interacts with the configuration subsystem 6 to obtain configuration settings, project settings and call recording parameters 29 to be used for the current recording. Configuration settings relevant for the recording subsystem include project identification and recording authorization, time-based segmentation parameters, encoding formats and parameters, and workflow parameters, identifying which indexing subsystem 8, playback subsystem 9 and management subsystem 10 are to be used to process and archive the current call recording.

In one embodiment, the recording control module 15 is activated by a connection request sent from the external audio/video conferencing system 5 by sending Dual Tone Multi Frequency (DTMF) or voice commands 20. To the conferencing system, the recording subsystem appears to be just another participant on the conference call. An audio conferencing system 5 can connect to the recording module 7 by dialing a telephone number of the recording subsystem gateway. A video conferencing system 5 can connect to the recording subsystem 7 by dialing the appropriate ISDN or network based address of the recording module or gateway as required. In another embodiment the recording control module contacts the external conferencing system upon direction of the project manager or meeting leader through the configuration subsystem 6. For example the project manager can configure the configuration module to pre-dial an external audio conferencing system every Wednesday at 1:00 PM in order to record a project's weekly status call.

The DTMF or voice commands 20 are initiated by the meeting leader of the external conferencing system in response to a menu of prompts generated by the conference recording menu module 16. The menu module generates a series of interactive prompts 21 to guide the meeting leader through the steps required to initiate a recording session. In a preferred embodiment, the menu system would first ask the meeting leader to enter his project or member ID and pass code via the commands 20 to the recording control module 15. The entered user data 22 is sent to the management subsystem 10. Additional menu commands 23, 24 allow the meeting leader to pause the recording, resume, stop, blackout or delete recorded segments or an interval of the recording.

In response to a command 221 to start recording, the input stream 25 is connected to the recording module 17. Based on a configuration setting, the recording module segments the input signal into a series of contiguous recording segments. In a preferred embodiment the segmentation interval is set to 3-minute intervals, and a 1-hour meeting would result in twenty 3-minute recordings. The recording stream 256 is sent to a chunking buffer 18 which holds the recording until the preset time interval is complete and the full segment is recorded.

Once a segment is recorded, it is sent 26 to an encoder 19 to convert from the format used by the conferencing system to the formats 27 required for the playback system 9. The identification, format, and location of the playback stream is stored in the management subsystem 10, and only the stream itself is stored in the playback subsystem. Simultaneously, the chunking buffer 18, sends a complete segment 28 to the indexing subsystem 8.

FIG. 3 is a schematic of the indexing subsystem. The indexing subsystem 8 receives an input stream from the recording subsystem 7 and indexing configuration parameters from the configuration subsystem 6 and processes the input stream using a plurality of analysis modules to identify words, phonics, and topics contained in the recorded audio/video call. The recognized words, phonics and topics are stored in the management subsystem 10 database. The indexing subsystem can also send messages to the notification and navigation subsystem 11 whenever a word, phonic or topic is recognized. The indexing subsystem contains a indexing control module 30, multiple index analysis modules 31, 32, 33, 34, and three notification modules 35, 36, 42.

The indexing control module 30 interacts with the configuration subsystem 6 to obtain project settings and indexing parameters 37 to be used when analyzing the current recording. Configuration settings used by the indexing subsystem include project identification and indexing authorization, vocabulary, speech recognition and phonic recognition parameters and workflow parameters, identifying which management subsystem 10 and databases are to be used to hold the output of the indexing.

The indexing subsystem contains multiple audio indexing modules, and in one embodiment contains a speech recognition (SR) index module 31, a phonic index module 32, a project task analysis index module 33, and a contextual analysis module 34. The recorded audio streams from the recording subsystem are processed by both the SR and phonic indexing modules. The output of the SR and the project task modules are fed into the contextual analysis module 34.

To initiate an indexing process, the recording subsystem control module 15 sends an index command 24 to the indexing control module 30. An indexing command 38 is forwarded to the SR module 31 and phonic indexing module 32, which then opens the audio/video signals 39 in conferencing format from the recording segmentation buffer 18.

When a word in recognized by the SR module 31, it is simultaneously sent 40 to the recognized word database 41 in the management subsystem 10 and to the word notification module 36. Similarly, when a phonic or contiguous series of phonics is recognized by the phonic indexing module 32, the identified phonics are sent 42 to the recognized phonic database 43 and to the phonic notification module 35. Time codes, specifying the point within the recording of the recognized word or phonics are also sent 40, 42 to the management and notification subsystems.

After all of the individual segments have been processed by the SR and phonic indexing modules, the resulting recognized words are processed by the contextual analysis module 34. To start this process, the indexing control module 30 sends index commands 44 to the project task analysis module 33 and to the contextual analysis module 34. The project task analysis module 33 retrieves 46 the relevant project task file from the project task database 50, and the contextual analysis module 34 retrieves 47 the recognized words from the recognized word database 41.

The project task analysis module 33 extracts from the project file a series of information about each task including the task identification, name, comments, resource assignments, start and end dates, completion status, and dependencies. This information is fed 51 to the contextual analysis module 34, and also is stored 46b in the database 50.

The contextual analysis module 34 works in two steps. First, the module takes all the recognized words 47 from the recognized word database 41, arranged in chronological order, and statistically assigns a relevance weighting for every pair of recognized words. In one embodiment, the weightings are obtained by comparison to a historical co-occurrence database. In another embodiment further statistical mechanisms including speech anomalies and utterances, silence detection, and word synonyms are used to supplement the co-occurrence database. The result of this step is the creation of time intervals, designating a preferred start time and stop time covering the period of the audio recording related to the recognized word. These relevance intervals are sent 48 to the relevance interval database 52 and are returned by the management subsystem 10 when responding to search queries.

The second step of the contextual analysis module uses the project task information feed 51 from the project task indexed analysis module 33 to create a task-based segmentation of the recording. In this step, each relevance interval 48 determined above is associated with zero, one or multiple tasks, and a relevance weight is assigned, designating the strength of the association. These associations and weightings are stored in the management subsystem 10 databases to respond to subscriber query and navigation requests.

When a task or other contextual interval is recognized by the contextual analysis module 34, it is also simultaneously sent 49 to the contextual notification module 42. Each subscriber who has registered to be notified, will be sent a message with relevant recording and timecode information whenever the contextual event is recognized by the analysis module 34. In a preferred embodiment the contextual analysis notifications use the project ID and name for the unit of granularity for notifications. In another embodiment, the contextual notifications use a hierarchy of tasks. In a third embodiment the contextual notification uses concepts, which cover multiple tasks in a non-hierarchical fashion.

FIG. 4 is a flowchart of the process for the automatic topic-based indexing method. The process begins with an audio input 120 and is processed via a speech recognition application 121. The words recognized by the application are stored in the recognized word database 122. The time code at which that the recognized word occurs in the input recording is also stored.

After processing all the segments of the input recording we iterate over the local sets collection of recognized words 123. Using temporal windows of various durations, each pair of words in the window are located in a co-occurrence table 126, and their generic correlation factor is obtained. Temporal windows that have substantially large number of highly co-occurring words 124 are marked as a recording interval and stored in the database 125. Note that a recording can have many overlapping intervals. Processing continues until all words pairs have been processed 127.

Now for each saved interval 125 a context-vector is created 128. The context vector is a vector representation of stem words identified within an N-space of all words. The N-space can either be a generic universal dictionary, a smaller industry specific vocabulary, or an even smaller custom project specific vocabulary.

On a parallel path, project task data is input at 130. We iterate over each task in the project file 131 and save the task data detail 132. For each task, a context-vector 133 is calculated using stem words extracted from the task data include the task name and comments. The context vector is a vector representation of words within the same N-space described above.

Furthermore the project file is examined to determine the correlation between each pair of tasks 134. For example, a task T1 which has a subtask T2 is given a large weighting. Task T3 that is a prerequisite for task T4, and both are given large weights. Tasks that have been scheduled over the same time period are given medium weights. Tasks with no project relationship are give low weights.

To determine the correlation between recording interval 125 and tasks 132, the dot product of the context-vectors found in steps 128 and 133 is taken at step 140. Intervals that have strong relations with a task will have a large dot product.

Furthermore, after the one-way task to interval relationships have been found, this information is used to determine two-way interval-to-interval relationships 141. If interval A and interval B both have high correlation with task T1, then interval A and B are thought to have high correlation to each other. The correlation values are stored in 142.

FIG. 5 is a schematic of the management subsystem 10 showing the databases that hold the results of the recording and indexing subsystems and components used to control access to this information. The database components of the management subsystem 10 receive inputs from the recording subsystem 7, indexing subsystem 8 and configuration parameters from the configuration subsystem 6.

The management subsystem contains a management control module 52, a configuration database 53, a user access database 54, and a system database 55 housing recording information records 56 and recording location records 62, project task records 57, relevance interval records 58, recognized word records 59 and recognized phonic sequences 60. The management subsystem also contains a notification subscription database 61.

The management control module 52 interacts with the configuration subsystem 6 to collect and house all setting and configuration parameters used in the system. The project manager 2 (see FIG. 1) is responsible for setting initialization parameters through the configuration system 6 that govern the recording, indexing, and management throughout the recording and project lifecycle. Changes (additions, modifications, deletions) 63 made by the project manager are submitted via the configuration subsystem to the control module and are stored in the configuration database 53. To populate the user interface of the configuration subsystem, records are retrieved 64 from the configuration database 53.

In the course of recording and indexing, the recording subsystem 7 and the indexing subsystem 8 send commands 65 and data to create new system records. These commands are processed first by the management control module 52. The management control module 52 consults the user access database 54 to determine if the requesting user is authorized to performed the desired action. In the preferred embodiment the user access database contains Access Control Lists (ACLs) stored in a Lightweight Directory Access Protocol (LDAP) server. In another embodiment the ACLs are stored in a relational database or on the file system using standard encryption protocols for security. If the user is authorized, the request is performed by the system database 55, which creates a database record of the correct type and populates the record with the values submitted in the request.

In the preferred embodiment the system database 55 is implemented using a relational database management system (RDBMS). In another embodiment the system database utilizes an object database management system. In a third embodiment the system database uses a file system and directory structure to create a hierarchal file system database.

The recording information records 56 contain the recording date and time, the meeting leader for the recording, meeting participant information if available, and system identification denoting which recording module and parameters where used to record the conference call. Each recording has a unique recording ID, which is used to associate or join the record to any other record in the system database.

The recording location records 62 contain information of where the recording media is stored on one or more playback servers 9.

The relevance interval records 58 contain the interval start time and stop time relative to the recording and a weighting to describe the strength or confidence of the interval. Relevance intervals are further associated with recognized words and tasks.

The recognized word records 59 contain the words that are recognized by the speech recognition analysis module. Each record contains an ID, the recognized word, the time code of the occurrence of the word relative to the recording and a confidence variable statistically denoting the likelihood of a correct match rather than a false positive.

The recognized phonic sequence records 60 contain the phonic sequences that have been recognized by the phonic analysis module.

The notification subscription database 61 contains records of notification requests submitted by subscribers. Notification requests have three forms: phonic sequence, recognized words, and context topics. A subscriber submits a request to be notified by the indexing subsystem 8 immediately upon the occurrence of one or more of these types of events that match certain conditions requested by the subscriber. The subscription requests are stored in the subscription database 61, and passed to the indexing subsystems 8.

FIG. 6 is a schematic of the management subsystem 10, showing the process to resolve a subscriber request. Requests 71 made by a subscriber via the notification and navigation subsystem 11 are in one of three forms: query requests 72, navigation requests 73 and notification requests 74. Query requests are requests to retrieve a set of results that match certain conditions submitted by the subscriber. Query requests are performed in an ad-hoc manner. Navigation requests are requests to retrieve a new recording or recording interval, or give a current recording or interval and a temporal offset or some other iteration offset. Navigation requests can be made only after first obtaining a results set from either a query request of a notification request. A notification request is submitted by a subscriber indicating his desire to be notified immediately whenever the indexing subsystem identifies an event that matches some set of conditions of interest to the subscriber.

In addition to the database components listed in FIG. 5, the management subsystem 10 contains a request parser 66, a phonic match module 67, a speech recognition (SR) match module 68, a contextual topic match module 69, and a result merger module 70. The navigation match module 75 is responsible for resolving navigation requests. The match modules 67, 68, 69 and 75 utilize the system database 55 when identifying potential matches. Also shown in FIG. 6 and previously shown in FIG. 5 are the notification subscription database 61 and the user access and permission database 54.

A request 71 is first submitted by a subscriber via the notification and navigation subsystem 11 and is processed by the request parser 66. The request parser determines the request type: query, navigation, notification and parses any input query conditions. Query requests 72 are sent to one or more of the phonic match module 67, SR match module 68 or the contextual match module 69, depending upon the query request parameters. Navigation requests 73 are sent to the navigation match module 75. Subscription requests 74 are sent to the notification subscription database 61.

A query request may result in multiple matches 76 being identified from one or more of the match modules 67, 68, 69. Each match obtained from the phonic match module 67 contains a recording ID, a time code and a relevance value indicating the confidence that the result is not a false positive. Each match from the SR match module 68 returns the recording ID and the start and end times an interval surrounding the matched word along with a confidence value. Each match from the contextual match module 69 contains the recording ID, topic ID, and the interval IDs previously associated with the topic by the indexing subsystem.

The results of the match modules are submitted to the result merger module 70, which is responsible for merging the results to obtain the best fit interval for the query request. The query request and result merge process details are further described in FIG. 7. The merged results 77, are then filtered by the user access database 54, allowing only the recording and intervals to which the subscriber has access to be returned as filtered results 78.

A navigation request works in a similar manner. After the request parser 66 determines the subscriber request is for a navigation command, the request 73 is passed to the navigation match module 75. The navigation match module consults system database 55 to determine a set of match records based on the desired navigation action. Each match record contains the recording ID, and a time interval and possibly a topic ID. These navigation results 79, are then filtered by the user access database 54, allowing only the recording and intervals to which the subscriber has access to be returned 78.

Subscriber notification requests 74 are sent to the notification subscription database 61 via the management control module 52 shown in FIG. 4, which first checks the user access database 54 prior to inserting into the subscription database.

FIG. 7 is a flowchart of the process to find and merge the results of a user query request. This process uses the results obtained automatically in the indexing method described in FIG. 4. The process begins with a user making a search request at step 150. A user either makes a request via entering a text string on a search window of a computer program, or by speaking the search term into a microphone or telephone 151.

Query requests that are typed directly by the user are passed to the search module at 154, which tries to find matching words from the recognized word database 155.

Spoken requests are first processed by a speech recognition module 152 prior to searching for keywords as above at step 154. Additionally, for a spoken request, a phonic or acoustical fingerprint is taken 153. This fingerprint is used to look up 158 any of the recognized phonics in the database 159.

In each scenario, if no match is found, step 157 is reached. If neither approach yielded a match, then the user is 50 notified.

If a match is found in either approach, in step 161 the time code for every match is extracted. For each time code, we locate every interval 162 from the interval database 163 that spans the found time code.

For each interval, at step 164, we look up the set of associated tasks from the correlation database 165 that have high correlation values.

Next, for each associated task we further find 166 from the interval correlation database 167 any other interval that also has a high correlation with the identified task. The results are organized at step 168 and graphically presented to the display system of the user. These results are described in FIG. 9 and are used to control the playback of a result set.

FIG. 8 is a schematic of the notification and navigation subsystem. The notification subsystem 11 receives query, navigation and subscription requests from subscribers 12 and returns the results that meet the request conditions. Configuration parameters are obtained from the configuration subsystem 6. The notification subsystem communicates with the query resolver and the notification database of the management subsystem 10, as previously described. In addition to returning results of a query to a subscriber, the notification module may communicate with the playback subsystem 9, allowing the subscriber to listen (or view) the requested recording.

In the preferred embodiment there is a plurality of notification and navigation subsystems. Each subsystem is configured for a single type of user interface. For example, one subsystem is used for handle requests from subscribers using a web browser via HTTP. Another subsystem is used to handle requests from mobile phone users via Wireless Access Protocol (WAP), and a third subsystem is used to handle requests made by voice commands over a traditional phone system.

Each notification and navigation subsystem contains an control module 80, a notification module 81, a query module 82, and a navigation module 83. A notification filter 84 is also shown and may resided in either the notification subsystem 11 or in the indexing subsystem 8 described in FIG. 3.

The indexing control module 80 interacts with the configuration subsystem 6 to obtain configuration settings and parameters 85 used by the notification subsystem. Configuration setting include: supported formats and functions, user interface preferences and workflow parameters identifying which management subsystem 10 and databases are to be consulted in fulfilling a request.

A query 88, navigation 89, or subscription notification 87 request is first submitted by a subscriber 12. Query requests 88 are sent to the query module 82. Navigation requests 89 are sent to the navigation module 83. Subscription notification requests are sent to the notification module 81. Each of these modules is responsible for interacting with a subscriber via some type of user interface, handling requests submitted by the user, passing the request 90 to the management subsystem 10, collecting the response results 91 from management system and presenting the results 92 in a format suitable for the user's interface device.

Additionally, the navigation module 83 may communicate with the playback subsystem 9, allowing the subscriber to listen (or view) the requested recording. While some navigation commands, such as fast-forward, rewind, pause can be sent 93 directly from the subscriber to the playback server, other navigation requests 89 particularly inter-recording navigation require the use of the navigation module 83. Additionally some playback subsystems, particularly interactive voice systems for traditional telephony require the use the navigation module 83 to act as a command gateway 94 between the subscriber device 12 and the playback system 9.

After a subscription notification has been registered in the notification database 61, it is propagated to the notification filter 84 via a notification agent 98. Whenever one of the indexing subsystem's notification modules (35, 36, 42 in FIG. 3) triggers a notification event, a message 96 is sent from the indexing subsystem to the notification filter 84. A notification filter may reside in either the notification subsystem 11 or in the indexing subsystem 8 described in FIG. 3. Rather than propagating every event, the notification filter 84 sends an event message 97 to the notification module 81 only when at least one of the conditions in a subscription request is satisfied. This filtering substantially reduces message traffic between the indexing subsystem and the notification module. The notification module 81 is then responsible for passing the notification event 92 to specific subscribers who are interested in the event, via the mechanism (e-mail, instant message, pager, phone call) desired by the subscriber.

FIG. 9 is an illustration of one embodiment of the graphic representation and display of a result sets. The results of user query requests or of a topic notification are displayed as a matrix 170. Each row of the matrix represents one topic, which in this illustration is shown as project tasks 171. At the top of the figure, a timeframe indicator 172 is shown. In this embodiment the timeframe shown is temporal, with major units of months and minor units of weeks.

For each interval in the result set, an iconic representation 178 is displayed at the correct location on the matrix. In this example the icon is displayed on the line for Task 4, having a timeframe of November 2002.

For each result set, a graphic indication of the relevance of the result can be used. For example, highly relevant intervals may be shown using a green icon 175 or with bright shading. Less relevant intervals can be color coded with yellow icons or shown with a darker shading.

Each graphic icon also displays the interval start and stop times 175 and other recording data 176. Each interval has a player control 177, allowing the user to select and play that recording interval easily.

As an alternative to the task hierarchy 171, the rows of the matrix could represent topic classifications manually entered, or could display the results ordered by rank based on the relevance scores determined in the indexing method.

As an alternative to the temporal time frame 172, a discrete column could be displayed for each distinct recording in the collection set.

FIG. 10 is a schematic of the playback subsystem. The playback subsystem 9 stores audio and video conference calls that are recorded by the recorder subsystem 7. The playback subsystem receives navigation requests 106 directly from subscribers 12 or via 107 the notification and navigation subsystem 11 and plays requested audio or video media file at the desired time offset. The subsystem obtains storage and playback configuration parameters from the configuration subsystem 6.

The playback subsystem contains a control module 100, a media transport module 101, a media storage module 102, and a media server 103.

The playback control module 100 interacts with the configuration subsystem 6 to obtain storage and playback setting 105. These setting include: supported formats which can be stored and played, encryption parameters, playback preferences and workflow parameters identifying the mount points or storage interface for media storage module 102.

In the recording subsystem 7 the audio video conference call is converted from the format used by the conferencing system to the formats supported for the playback server 103. The identification, format, and location of the playback stream is stored in the management subsystem, and only the recording is stored in the playback subsystem. When the recording subsystem 7 converts a recording, it contacts 111 the media control module 100, which instructs 112 the transport module 101 to retrieve and archive the recording. The transport module opens a transport channel to the recorder subsystem and pulls 113 the encoded recording from the encoder (19 in FIG. 2). The transport module simultaneously opens a write channel 108 to the media storage 102, and moves the recording by reading from the encoder buffer and writing to the media storage module. In the preferred embodiment the media transport module uses a reliable File Transport Protocol (FTP) to move the recording from the encoder to the media storage.

A navigation request 106 is submitted by a subscriber 12 to the notification and navigation subsystem 11, and is forwarded 107 to the control module 100. The navigation request contains all the information 114 required to locate the recording content 110, start time and stop time and media server 103 used to stream the media back 109 to the subscriber. This information had previously been obtained by notification and navigation subsystem querying the management system as described in FIGS. 6 and 9.

A subscriber 12 may issue a navigation command 108 directly to the media server 103 for intra-recording navigation including: stop, pause, rewind, fast-forward or to jump to a specific time offset within the audio or video stream currently being played. These commands are only appropriate after an audio or video stream has been retrieved.

While the invention has been described with reference to specific embodiments, modifications and variations of the invention may be constructed without departing from the scope of the invention, which is defined in the following claims.

I claim:

1. A system for recording and indexing audio and video conference calls comprising, a configuration subsystem, at least one recording subsystem connected to the configuration subsystem for connecting an external audio or video conferencing system, at least one indexing subsystem connected to the at least one recording subsystem for automatically determining topic based intervals, at least one management subsystem connected to the at least one indexing subsystem for storing results of the indexing subsystem, at least one notification and navigation system connected to the at least one management subsystem for allowing a plurality of subscribers to query the at least one management subsystem and to submit requests to be notified of an occurrence of a topic based event, and at least one playback subsystem connected to the at least one recording subsystem for storing recorded conference calls in a variety of formats suitable for playback on a variety of devices.

2. The system of claim 1, wherein the recording subsystem further comprises a control module, a conference menu module connected to the control module, a segmentation buffer connected to the recording module, a recording module connected to the segmentation buffer, and an encoding module connected to the control module.

3. The system of claim 2, wherein the recording module automatically segments conference recordings into discrete, continuous segments based on parameters specified by the control module.

4. The system of claim 2, wherein the recording module passes recorded segments to the encoding module via the segmentation buffer for encoding the segments in a format for playback by a media server.

5. The system of claim 2, wherein the conference menu module is connected to the external conferencing system, and generates voice or text menu prompts for allowing conference leaders to control the recording subsystem.

6. The system of claim 5, wherein the control module responds to Dual Tone Multi Frequency (DTMF) commands generated by the conferencing system.

7. The system of claim 5, wherein the control module responds to voice input by a conference leader through the conferencing system.

8. The system of claim 2, wherein the control module in response to a command from the external audio or video conferencing systems, controls recording and indexing of a conference call.

9. The system of claim 2, wherein the segmentation buffer holds recording segments until the indexing subsystem retrieves and has finished processing the segments.

10. The system of claim 2, wherein the control module in response to user prompts passes user data to the management subsystem.

11. The system of claim 1, wherein indexing subsystem further comprises a control module, a speech recognition indexing module connected to the control module, a phonic indexing module connected to the control module, a project task analysis module connected to the control module, and a contextual analysis module connected to the control module.

12. The system of claim 11 further comprising a speech recognition notification module connected to the speech recognition indexing module, a phonic recognition notification module connected to the phonic indexing module, and a contextual notification module connected to the contextual analysis module.

13. The system of claim 12, wherein the notification modules are connected to the notification and navigation subsystem, and upon recognition of a recognized word, phonic or topic send a message that contains the identified word, phonic or topic to a notification filter.

14. The system of claim 11, wherein the control module is connected to the recording subsystem for responding to commands from the recording subsystem for starting and stopping indexing of a recording segment.

15. The system of claim 11, wherein the speech recognition indexing module is connected to the recording subsystem for indexing recording segments and populating a database of recognized words and timestamps in the management subsystem.

16. The system of claim 15, further comprising a general co-occurrence database in the management subsystem and wherein the contextual analysis module automatically creates topic-based recording interval using recognized words from the speech recognition module and the general co-occurrence database in the management subsystem.

17. The system of claim 16, wherein the context analysis module further calculates a context-vector for each topic-interval.

18. The system of claim 11, wherein the phonic indexing module analyzes recording segments and populates a database of identified phonics and corresponding timestamps in the management subsystem.

19. The system of claim 11, further comprising a project database in the management subsystem and wherein the project task analysis module parses project file and stores task information in the project database in the management subsystem.

20. The system of claim 19, wherein the project task analysis module further creates a context-vector for each extracted task.

21. The system of claim 20, wherein the project task analysis module further calculates a task-task weighting.

22. The system of claim 21, wherein the project task analysis module further calculates a task-task weighting, and wherein the weighting is derived from task-subtask relationship, task dependencies, task resource assignments, and/or task scheduling correlations.

23. The systems of claim 20, wherein the project task analysis module further combines the context-vectors of the recording intervals with the context vectors of the project task to create an interval-task correlation factor, and stores the correlation factor in a database in the management system.

24. The system of claim 23, wherein the project task analysis module further calculates interval-to-interval associations as a product of two interval-task correlation factors for each pair of interval-task associations having a common task, and stores the interval-to-interval association factors in a database in the management system.

25. The system of claim 1, wherein the management subsystem further comprises a control module, a user access database connected to the user access database, a notification database connected to the control module, a configuration database connected to the user access database, a system database connected to the control module for containing tables and records for recording information, recording location, project tasks, recording intervals, recognized words, recognized phonics, interval-task correlation factors, and interval-to-interval correlation factors.

26. The system of claim 25, wherein the management subsystem further comprises a request parser module connected to the control module, a phonic match module, a speech recognition match module, and a contextual match module, all connected to the request parser, and to a result merger module connected to the user access database.

27. The system of claim 26, wherein the management subsystem further comprises a navigation request match module connected to the request parser.

28. The system of claim 26, wherein the request parser module responds to requests from the notification and navigation subsystem and depending upon the request type passes the request to the appropriate match module.

29. The system of claim 28, wherein said match modules determine a set of matching phonics, recognized words or topics by comparison with the set of phonics, recognized words or topics stored in the system database of the management system.

30. The system of claim 26, wherein the result merger module takes output of one or more of the match modules creating a merged set of results.

31. The system of claim 30, further comprising a user access database, and wherein the merged results are filtered by checking the user access database, so that only results that the requester is allowed access are returned to the user.

32. The system of claim 31, wherein filtered results set are ordered and graphically represented using a matrix format, with a cell of the matrix populated with an playback control icon.

33. The system of claim 1, wherein the notification and navigation subsystem further comprises a control module, a query module connected to the control module, a navigation module connected to the control module, and a notification module connected to the control module.

34. The system of claim 33, further comprising a notification database in the management system and plural notification filters in the management system, and wherein the notification module in response to a notification request from a subscriber, stores the notification parameters in the notification database in the management system, and further passes the notification parameters to each of the plural notification filters in the management system.

35. The system of claim 33, wherein upon reception of messages indicating that an event of interest has occurred, the notification module passes notification to each and every subscriber who has previously requested to be notified, and who has subscribed to events having a set of conditions that match a current notification event.

36. The system of claim 33, further comprising a request parser of the management system and wherein the query module accepts query requests from subscribers and passes the query request to the request parser of the management system.

37. The system of claim 36, wherein the navigation module accepts navigation requests from subscribers and passes the navigation request to the request parser of the management system.

38. The system of claim 37, wherein the navigation module communicates with the playback subsystem for initiating or controlling playback of a recording.

39. The system of claim 33, wherein the control module, based on parameters entered by project mangers, controls settings used by the query module, notification module and navigation module.

40. The system of claim 1, where playback subsystem further comprises a control module, a media server connected to the control module, a media transport module connected to the control module, and a media storage module connected to the media transport and media server modules.

41. The system of claim 40, wherein the media transport module upon issuance of a command from the recording subsystem retrieves a recording segment and stores the segment in the media storage module.

42. The system of claim 40, wherein upon the issuance of a command from the notification and navigation system, the control module instructs the media server to retrieve the requested media from the media storage module for playback of media to a subscriber.

43. The system of claim 40, wherein upon issuance of a navigation command the control module instructs the media server to perform the command, and playback, pause or stop media at a timeframe identified in the command.

44. A method of automatically indexing audio or video conference calls for creating topic-based intervals comprising the steps of partitioning an audio input into one or more discrete segments, processing each of the segments using speech recognition, and saving recognized words and corresponding timestamping in a database, iterating over local sets of the recognized words, and looking up co-occurrence of the recognized words from a generic co-occurrence database, saving start and stop time of every interval where an entire set of recognized words have sufficiently high co-occurrence values, iterating over a set of saved intervals and creating a context-vector further comprising a vector representation of words in an interval within some defined N-space of words.

45. A method of automatically indexing project management files to create task context-vectors and task correlation values comprising the steps of iterating over each task in a project file and extracting task information including task name, description, comments, resource assignment, task dependencies and task schedule, and saving the task information in a task database, calculating a context-vector using the task name, the description and the comments for creating a vector representation of the task within an N-space of words, and saving the context-vector in a context-vector database, calculating a task-to-task correlation weighting based on the relationship between tasks, and saving the correlation weighting in a correlation weighting database.

46. A method of determining recording interval to task relationships comprising the steps of iterating over a set of intervals determined using the method of automatically indexing audio or video conference calls for creating topic-based intervals comprising the steps of partitioning an audio input into one or more discrete segments, processing each of the segments using speech recognition, and saving recognized words and corresponding timestamping in a database, iterating local sets of the recognized wards, and looking up co-occurrence of the recognized words from a generic co-occurrence database, saving start and stop time of every interval where an entire set of recognized words have sufficiently high co-occurrence values, iterating over a set of saved intervals and creating a context-vector further comprising a vector representation of words in an interval within some defined N-space of words, and for each interval further iterating over each task determined using the method of automatically indexing project management files to task context-vectors and task correlation values comprising the steps of iterating over each task in a project file and extracting task information including task name, description, comments, resource assignment, task dependencies and task schedule, and saving the task information in a task database, calculating a context-vector using the task name, the description and the comments for creating a vector representation of the task within an N-space of words, and saving the context-vector in a context-vector database, calculating a task-to-task correlation weighting based on the relationship between tasks, and saving the correlation weighting in a correlation weighting database, and determining interval task pairs, for each interval task pair, obtaining a dot product of the context-vectors from recording intervals and the context-vectors of the task, storing interval-task correlation values in a database.

47. The method of claim 46, further comprising determining correlation of one recording interval to another recording interval including the steps of for each pair of interval-task correlations calculated, further taking the weighted dot-product of the interval-task corrections and task weight correlation values from the correlation weighting database, storing the results in a recording interval correlation database.

48. The method of claim 47, further comprising searching a collection of recording that have been indexed using the method of determining correlation of one recording interval to another recording interval including the steps of receiving a search request from a user in either text of vocal form, if in a vocal form audio input, processing the audio input using a speech recognition application resulting a an equivalent input text string, passing the input text string or an equivalent to a match module for comparing with the results of the recognized words from method of determining correlation of one recording interval to another recording interval, further processing the audio input for determining acoustical or phonic fingerprints and passing the fingerprints to a phone match module, for every word or phonic match of sufficient confidence, determining a time code when the match occurred within the recording, for each time code, looking-up all recording topic intervals calculated in determining correlation of one recording interval to another recording interval that overlap or span the time code, for each interval finding correlated tasks from the project analysis index, for each correlated task, further finding other recording intervals that are also correlated to the same task, merging a set of located recording intervals, filtering a result set so only results that are accessible by the requestor are returned, organizing and displaying the filtered result set.

49. The method of claim 48, further comprising organizing and displaying results of a query determined in the method including creating a matrix having rows, columns and cells, displaying task hierarchy or other such classification scheming in the rows, displaying a temporal timeframe, for discrete recording events as the columns, for each cell that has a significant interval-task correlation value, displaying one or more playback control icon having one or all of the following elements: the interval start and stop time and duration, recording data for the interval, and a control object capable of sending start, stop, pause, fast-forward or rewind commands to a media server to control the playback of the recording interval.

\* \* \* \* \*